May 29, 1928.  
W. SCHMIDT  
FURNACE FOR DOMESTIC HEATING PLANTS FOR SOLID FUEL  
Filed Jan. 29, 1925  
2 Sheets-Sheet 2
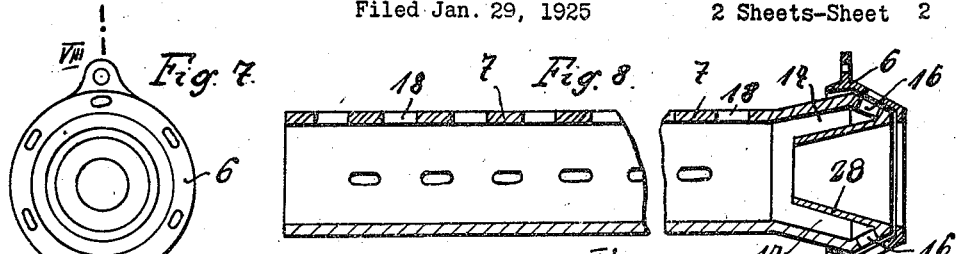
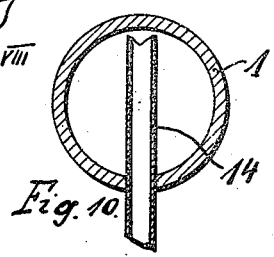
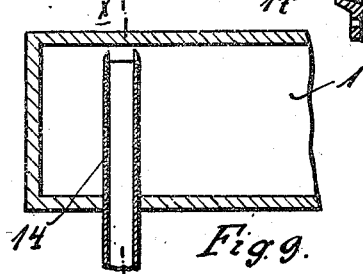
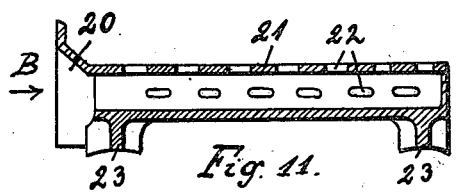
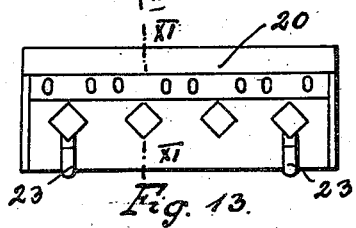
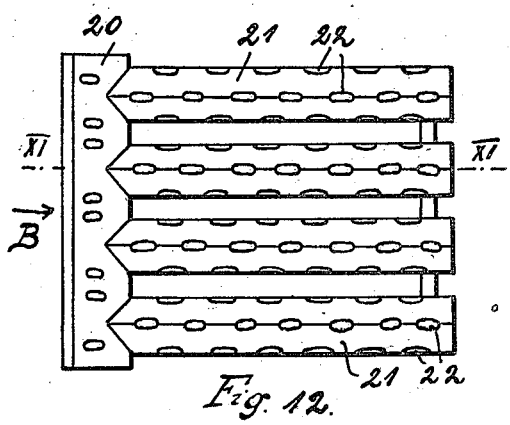
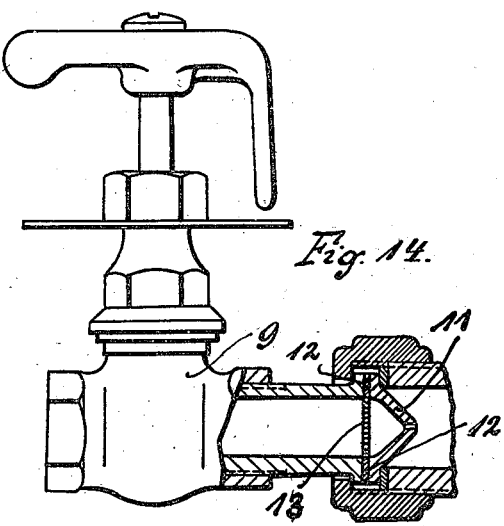

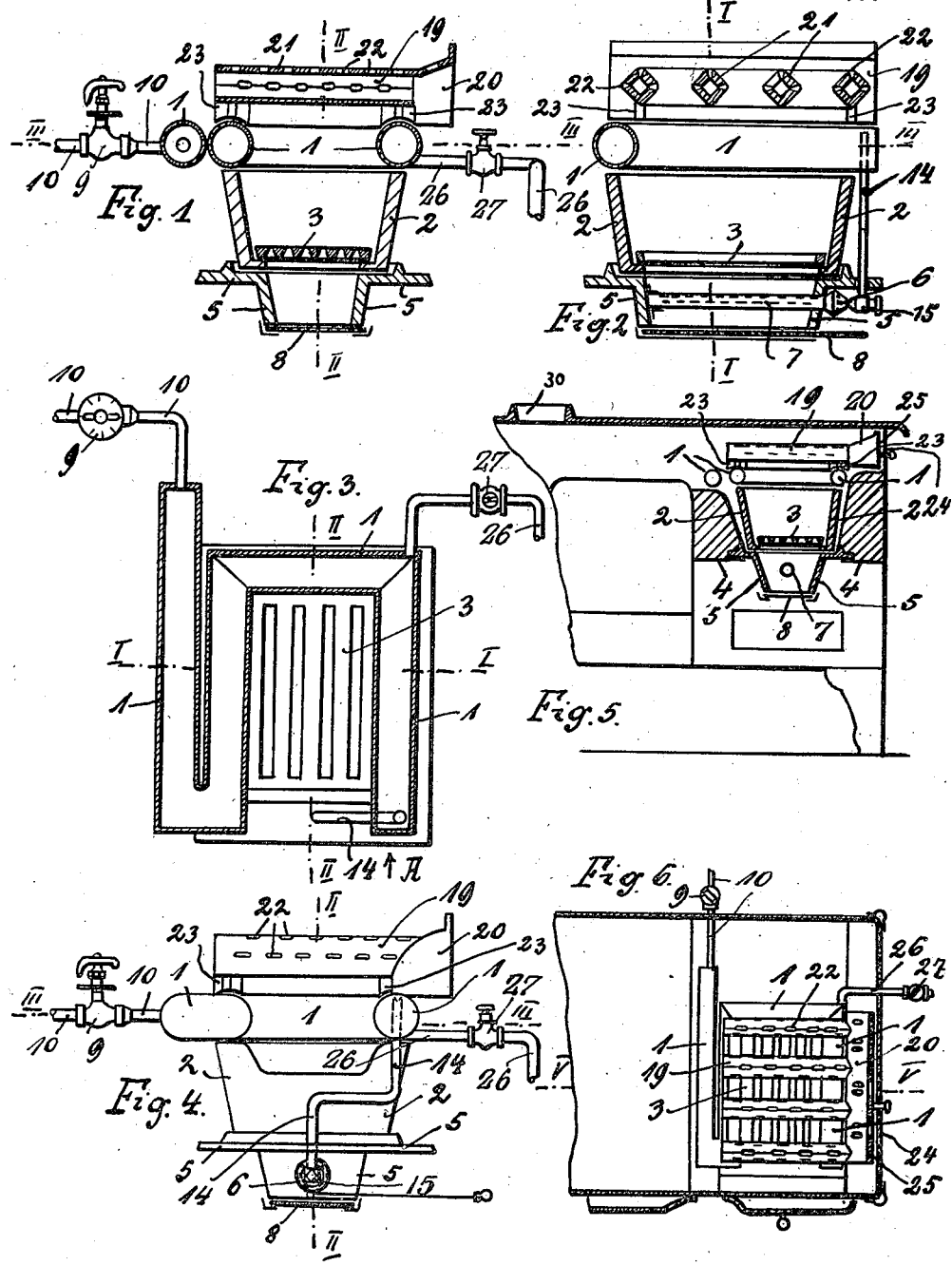

Patented May 29, 1928.

1,671,549

UNITED STATES PATENT OFFICE.

WILHELM SCHMIDT, OF BURGERHUTTE, GERMANY, ASSIGNOR TO BURGER EISEN-WERKE, GESELLSCHAFT MIT BESCHRÄNKTER HAFTUNG, OF BURGERHÜTTE, GERMANY.

FURNACE FOR DOMESTIC HEATING PLANTS FOR SOLID FUEL.

Application filed January 29, 1925, Serial No. 5,588, and in Germany March 29, 1924.

For domestic heating plants only kitchen ranges with natural draught have hitherto been used. Artificial draught has not been used as, on one hand, the expenses for the necessary mechanical plant were too high and as, on the other hand, the attendance of such plants requires skilled workmen. A further reason which prevented the use of artificial draught for dwelling houses is that it is not easy to adapt large-sized heating plants with artificial draught to the domestic uses.

This invention has for its object to improve domestic heating plants so that they may be worked with artificial draught. The invention relates to a device which permits of using, either artificial or natural draught and which can be added without great cost to any existing stove or kitchen range or to any stove or kitchen range when the same are being manufactured. This device produces the energy required for the artificial draught and ensures by means of this energy the production of a combustible gas mixture (air gas and water gas) the combustion of which takes place in such a manner that the surfaces for heating or cooking purposes are heated rapidly and effectively and that the waste gases contain only a minimum of combustible constituents.

The arrangement according to the invention permits of changing by a simple manipulation from artificial draught to natural suction draught and it effects in this case a reduction of the generally too large grate surface.

The arrangement according to the invention is shown, by way of example, on the accompanying drawing, in which:—

Fig. 1 shows the fire-pot and accessories to be inserted into the kitchen range in a vertical section on line I—I of Figs. 2 and 3.

Fig. 2 is a vertical section on line II—II of Figs. 1, 3 and 4.

Fig. 3 is a horizontal section on line III—III of Figs. 1, 2 and 4.

Fig. 4 is an elevation seen in the direction of the arrow A in Fig. 3.

Fig. 5 shows the fire-pot shown in Figs. 1 to 4 inserted into the kitchen range and in a vertical section on line V—V of Fig. 6.

Fig. 6 is a plan view of Fig. 5, the top plate of the kitchen range being removed.

Fig. 7 shows in front elevation the mixing- and regulating-nozzle with the tube for distributing the steam and air.

Fig. 8 is a longitudinal section on line VIII—VIII of Fig. 7.

Fig. 9 shows in longitudinal section the rear end of the pipe coil and the steam delivering pipe penetrating into the same.

Fig. 10 is a cross section on line X—X of Fig. 9.

Fig. 11 shows the burner in section on line XI—XI of Figs. 12 and 13.

Fig. 12 is a plan view of the burner.

Fig. 13 is a front elevation of the burner viewed in the direction of the arrow B in Figs. 11 and 12.

Fig. 14 shows in elevation, partly in section, the inlet valve for the water to be evaporated.

Referring to Figs. 1 to 6; 1 designates a pipe coil for producing and superheating steam. This pipe coil 1 is mounted upon the fire-pot 2 in which the fuel is placed on the grate 3. All these elements are mounted on chamber 5 in the grate support 4 of the kitchen range (Fig. 5) adjacent which chamber the mixing and regulating nozzle 6 with the steam distributing pipe 7 (Figs. 7 and 8) and the damper 8 for throttling the air forced under the grate, are mounted.

A supply pipe 10 for the water to be transformed into steam (Figs. 1, 3, 4 and 6) is connected at one end either with a water main or with a water reservoir in which static pressure exists, and at the other end to the front end of the pipe coil 1, a valve 9 (Fig. 14) being inserted between this supply pipe and the pipe coil. The valve 9 regulates the inflow of water to the coil 1. In order to prevent the inflow of an excessive quantity of water into the pipe coil 1 owing to careless opening of valve 9 a regulating nozzle 11 (Fig. 14) is inserted the bore of which is adapted to the actual pressure in the water main and which allows only so much water to pass through as the heating surface of the pipe coil 1 can evaporate easily at normal working.

The regulating nozzle 11 has a copper packing 12 which carries a filter 13 to protect the nozzle against impurities.

To the front end of the pipe coil 1 a tube 14 is connected (Figs. 2, 3 and 4). The top end of tube 14 is inserted into the pipe coil 1 so that the steam is drawn off from coil 1 at the highest point of said coil (Figs. 9 and 10). The steam delivering tube 14 terminates at the lower end in a steam nozzle 15 (Figs. 2 and 4), which opens into the mixing and regulating nozzle 6 (Figs. 7, 8) which communicates with the steam-air distributing pipe 7. The mixing and regulating nozzle is constructed on the principle of double injecting effect. Through the inner cone 28 a uniform quantity of air is sucked in when the steam pressure remains uniform, said air mixing with the steam. In order to alter the percentage of air in the mixture when the steam pressure, on which depends the intensity of the artificial draught, remains uniform, a second inlet cone 17 is arranged (Fig. 8) which has adjustable inlet holes 16. In this manner it is possible to adapt the proportion of steam to air to the percentage of moisture of the fuel used, the strength of draught remaining the same. The distributing tube 7 for the mixture of steam and air is connected with the mixing and regulating nozzle 6, said tube 7 having narrow slots 18 (Fig. 8) through which the steam and air mixture flows out under the grate 3.

In order to ignite the gas mixture which is produced if the steam and air mixture traverses the fuel on the grate 3, a burner 19 is arranged above the pipe coil 1 (Figs. 1, 2, 4, 5 and 6). This burner 19 is composed of several tubes 21 (Figs. 11–13) which are arranged parallel with one another closed at one end and connected at the other open end with a box 20. The tubes 21 have each a great number of slots 22 (Figs. 11 and 12). The burner 19 is mounted by means of feet 23 (Figs. 1, 2, 4, 5, and 11) upon the pipe coil 1 as shown in Figs. 1, 2, 4, 5 and 6. The auxiliary air necessary for carrying out the combustion is admitted through slots 24 arranged in the side walls of the kitchen range (Figs. 5 and 6) a damper being arranged for regulating the air admission.

The operation is as follows:—

When the fuel in the fire-pot 2 is red hot the damper 8, which up to this moment had been open, is closed and consequently the natural draught throttled. The valve 9 inserted in the water supply pipe 10 is opened so that it regulates the admission of water to the pipe coil 1. According to the adjusting of valve 9 the water enters into the pipe coil 1 either drop by drop or in a thin jet and it is instantaneously transformed into steam, said steam being superheated in traversing the pipe coil 1. The superheated steam flows from the pipe coil 1 through the tube 14 into the steam nozzle 15 and hence into the mixing and regulating nozzle 6 in which it is admixed with air. This mixture of steam and air is distributed through tube 7 in chamber 5 under the grate 3. When the steam and air mixture flows through the incandescent layer of fuel a mixture of air gas and water gas is produced according to the well known laws, the composition of which mixture depends on the actual proportion between steam and air and on the reduction temperature due to the strength of the draught. These highly heated combustible gases transmit, when traversing the upper layers of fuel, a portion of their tangible heat to these layers of fuel and distill the same. The products from distillation and the mixture of water gas and air gas unite to form a highly valuable combustible gas mixture which ascends from the fire-pot 2, passes through between the coils of pipe 1 and flows through between the several tubes 21 of which the burner 19 is composed. The preliminarily heated air flowing out of the burner tubes 21 and which is on top of the ascending gas- and air mixture ignites the latter. The burnt gases flow to the left (Fig. 5) out through the flue 30 into the chimney.

If in the intervals between the boiling or heating periods the fire has to be reduced valve 9 is closed so that the water admission is interrupted and the damper 8 is opened in order to re-establish the natural air draught from below the grate. I order to enable the discharge of the water which has entered owing to the valve 9 having been left open by inadvertance, a tube 26 is arranged at the deepest point of the pipe coil 1 and a discharge cock 27 is arranged in this tube (Figs. 1, 3, 4, 6).

I claim:—

1. In a kitchen range, comprising in combination with the fire-pot, a pipe coil above said fire pot, means for supplying water from a water main to said pipe coil, an injecting nozzle underneath the grate in said fire-pot, a pipe open at both ends, connecting the highest point of said pipe coil with said injecting nozzle to conduct the super-heated steam from the said pipe coil to a distributing pipe below said fire-pot having an air nozzle, said injecting nozzle communicating with said air nozzle to inject steam and induce air into said distributing pipe for discharge below the fire-pot, a burner consisting of a number of tubes having outflow openings said burner being arranged above said pipe coil so that the gases from combustion ascending from said fire-pot ascend between said burner tubes, means for regulating the admission of outer air into said burner tubes, said air being preliminarily heated in said burner tubes by the heat from the fire-pot so that the heated air flowing from said burner tubes on top of said ascending gases from combustion ignite the same, and a chimney flue at the end of the kitchen range opposite to said burner for conducting the waste gases into the chimney.

2. In a kitchen range, comprising in combination with the fire-pot, a pipe coil above said fire-pot, a pipe for supplying water from a water main to said pipe coil, a regulating valve in said pipe, a regulating nozzle in said valve for regulating the admission of water to said pipe coil, an injecting nozzle underneath the grate in said fire-pot, a pipe open at both ends connecting the highest point of said pipe coil with said injecting nozzle to conduct the super-heated steam from the pipe coil to said injecting nozzle, a steam distributing pipe having an air nozzle communicating with said injecting nozzle under the grate of said fire-pot so that the air and steam mixture injected into said distributing pipe from said injecting nozzle is forced into the fuel in said fire-pot from below, a burner consisting of a number of tubes having outflow openings said burner being ararnged above the pipe coil so that the gases from the combustion ascending from said fire-pot ascend between said burner-tubes, means for regulating the admission of outer air into said burner tubes said air being preliminarily heated in said burner tubes by the heat from the fire-pot so that the heated air flowing from the said burner tubes on top of said ascending gases from combustion ignite the same, and a chimney flue at the end of the kitchen range opposite to said burner for conducting the waste gases into the chimney.

3. In a kitchen range draft, comprising in combination with the fire-pot, a chamber underneath said fire-pot and open at the top and bottom, a damper in the bottom end of said chamber, a pipe coil above said fire-pot, means for supplying water from a water main to said pipe coil, an injecting nozzle in said chamber underneath said fire-pot, a pipe open at both ends connecting the highest point of said pipe coil with said injecting nozzle to conduct the super-heated steam from said pipe coil to said injecting nozzle, a distributing pipe having an air nozzle communicating with said injecting nozzle whereby air and steam mixture is distributed below the firepot, a burner consisting of a number of tubes having outflow openings said burner being arranged above said pipe coil so that the gases from combustion ascending from said fire-pot ascend between said burner tubes, means for regulating the admission of outer air into said burner tubes said air being preliminarily heated in said burner tubes by the heat from the fire-pot so that the heated air flowing from said burner tubes on top of said ascending gases from combustion ignite in the same, and a chimney flue at the end of the kitchen range opposite to the said burner for conducting the waste gases into the chimney.

In testimony whereof I affix my signature.

WILHELM SCHMIDT.